(12) United States Patent
Pierzynski et al.

(10) Patent No.: US 6,383,128 B1
(45) Date of Patent: May 7, 2002

(54) METHOD OF IN SITU IMMOBILIZATION AND REDUCTION OF METAL BIOAVAILABILITY IN CONTAMINATED SOILS, SEDIMENTS, AND WASTES

(75) Inventors: Gary M. Pierzynski; Ganga M. Hettiarachchi, both of Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 09/526,413

(22) Filed: Mar. 16, 2000

(51) Int. Cl.$^7$ .............................. A62D 3/00; B09C 1/08
(52) U.S. Cl. ................ 588/256; 47/DIG. 10; 210/724; 405/128.5; 405/128.75; 588/236; 588/260; 588/901
(58) Field of Search .................. 47/DIG. 10; 71/903; 210/724, 743; 405/128.25, 128.5, 128.75, 129.5; 588/18, 236, 249, 252, 256, 260, 261, 901

(56) References Cited

U.S. PATENT DOCUMENTS

| | | | |
|---|---|---|---|
| 4,142,912 A | * | 3/1979 | Young ..................... 588/236 X |
| 4,601,832 A | * | 7/1986 | Hooykaas ............... 588/256 X |
| 5,162,600 A | | 11/1992 | Cody et al. |
| 5,202,033 A | | 4/1993 | Stanforth et al. |
| 5,429,751 A | * | 7/1995 | Hooykaas ................... 588/256 |
| 5,512,702 A | | 4/1996 | Ryan et al. |
| 5,637,355 A | * | 6/1997 | Stanforth et al. ....... 588/236 X |
| 5,649,894 A | * | 7/1997 | White et al. ................ 588/256 |
| 5,700,107 A | * | 12/1997 | Newton .................. 588/256 X |
| 5,846,434 A | * | 12/1998 | Seaman et al. ............. 210/724 |
| 5,877,393 A | * | 3/1999 | Webster ...................... 588/236 |
| 5,931,773 A | * | 8/1999 | Pisani ......................... 588/256 |
| 6,139,485 A | * | 10/2000 | Pal et al. .................... 588/256 |

* cited by examiner

*Primary Examiner*—George Suchfield
(74) *Attorney, Agent, or Firm*—Hovey Williams LLP

(57) ABSTRACT

Improved methods and compositions for decreasing the bioavailability of metals in soil are provided. Broadly, the methods comprise mixing a source of phosphorus and an oxide of manganese with the contaminated soil so as to reduce the metal bioavailability in the soil. The phosphorus source and oxide of manganese can be individually mixed with the soil, or can be provided as a premix powder or granule to be mixed with the contaminated soil. Preferably, the pH of the soil is then adjusted to, and maintained at, a level of at least about 7.0. Preferred phosphorus sources include phosphate rock, alkali and alkaline earth metal phosphates, ammonium phosphates, ammonium orthophosphates, orthophosphoric acid, and superphosphates. Preferred oxides of manganese include $MnO_2$, $Mn_3O_4$, birnessite, cryptomelane, and psilomelanes.

53 Claims, 18 Drawing Sheets

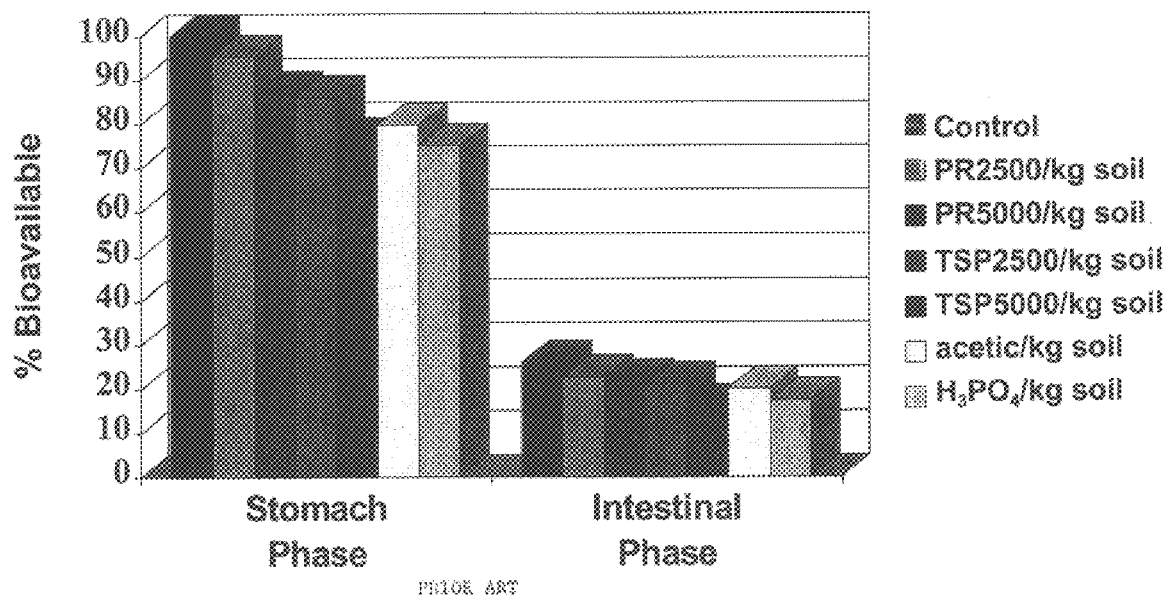
Figure 1 - Bioavailable Pb by PBET Dearing
PRIOR ART

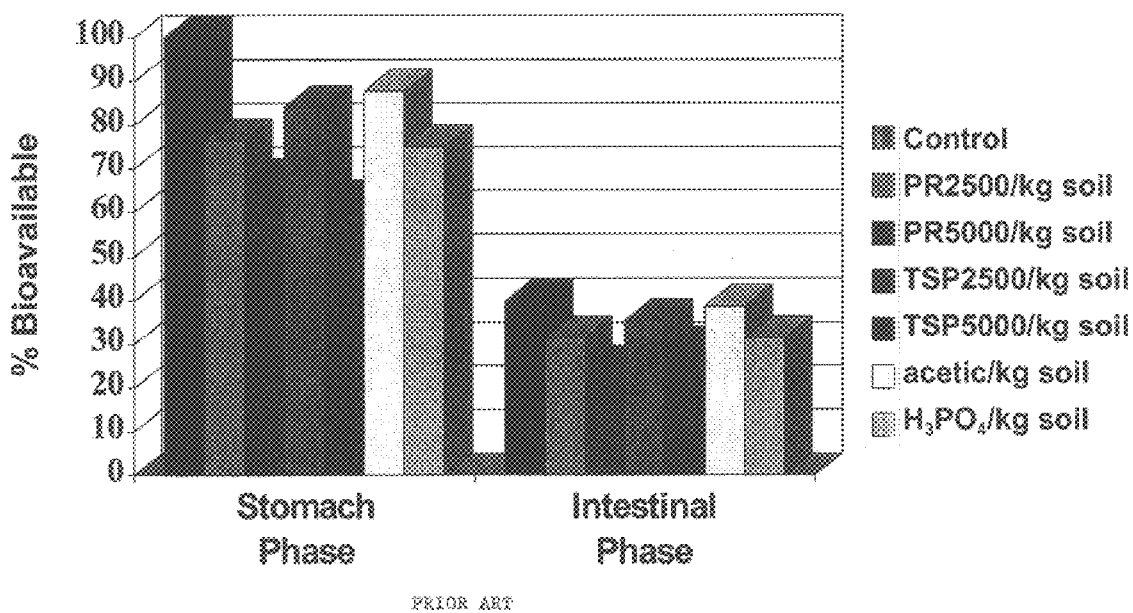
Figure 2 - Bioavailable Pb by PBET TCR
PRIOR ART

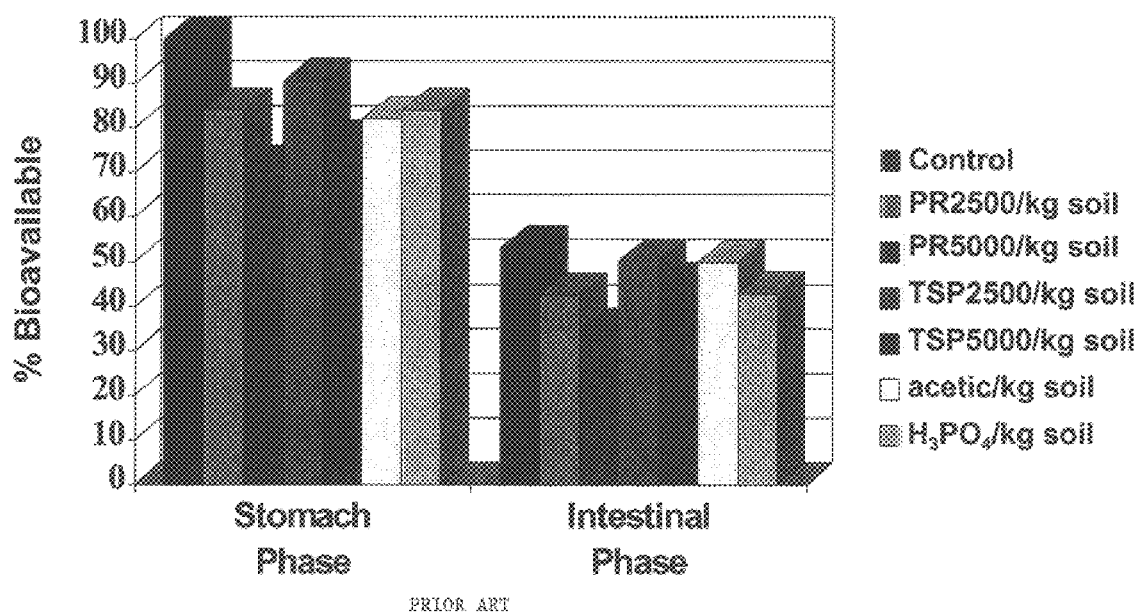
Figure 3 - Bioavailable Pb by PBET Joplin
PRIOR ART

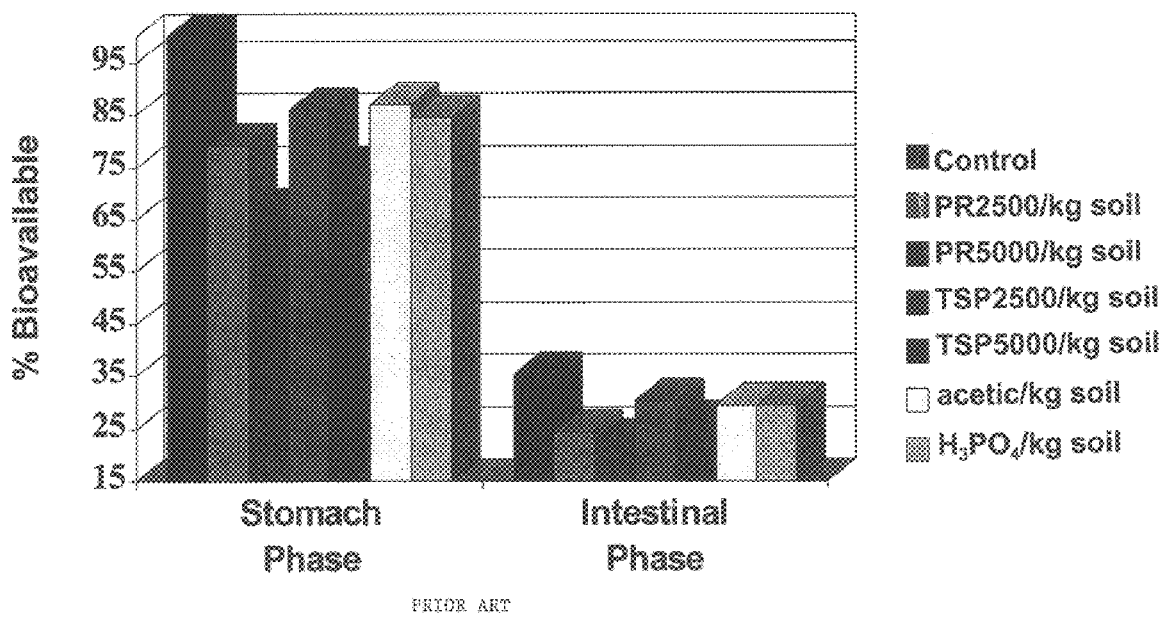
Figure 4 - Bioavailable Pb by PBET AR
PRIOR ART

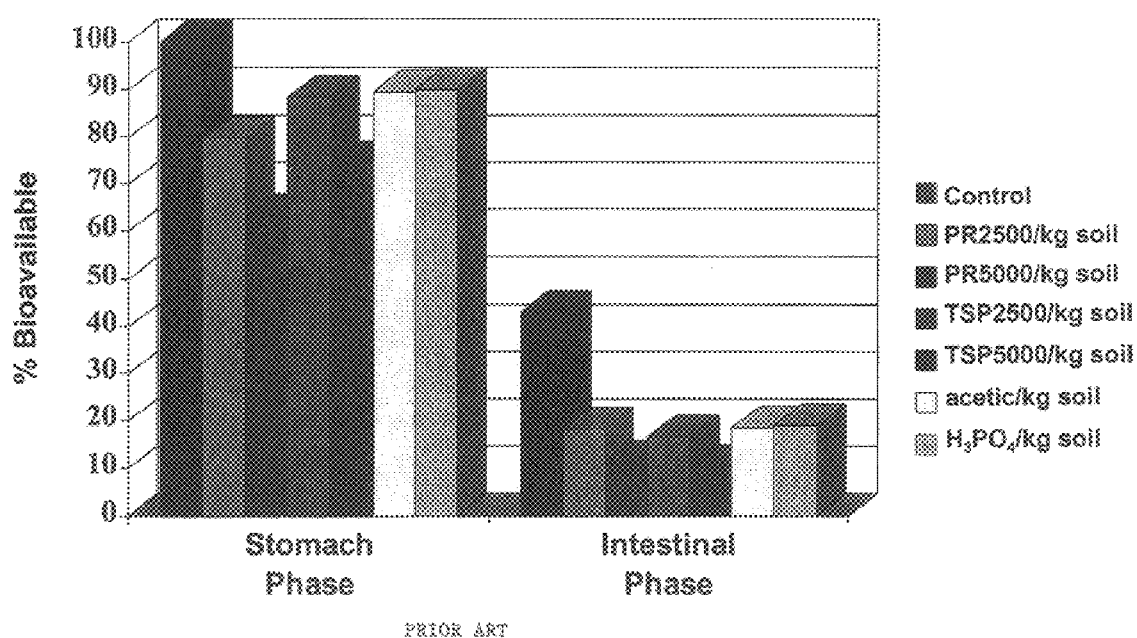
Figure 5 - Bioavailable Pb by PBET Chat

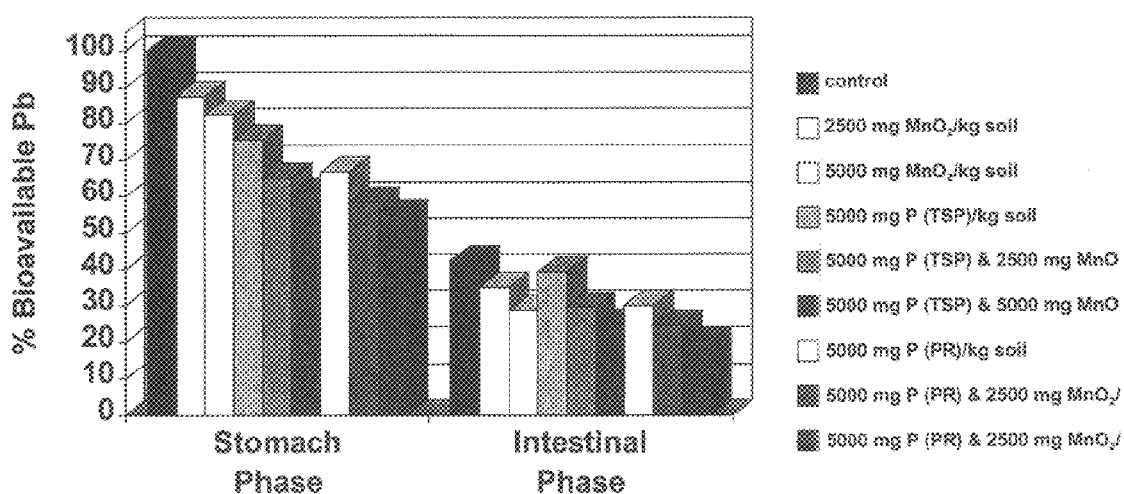
Figure 6 - Bioavailable Pb by PBET: Joplin
(the averages across the time)

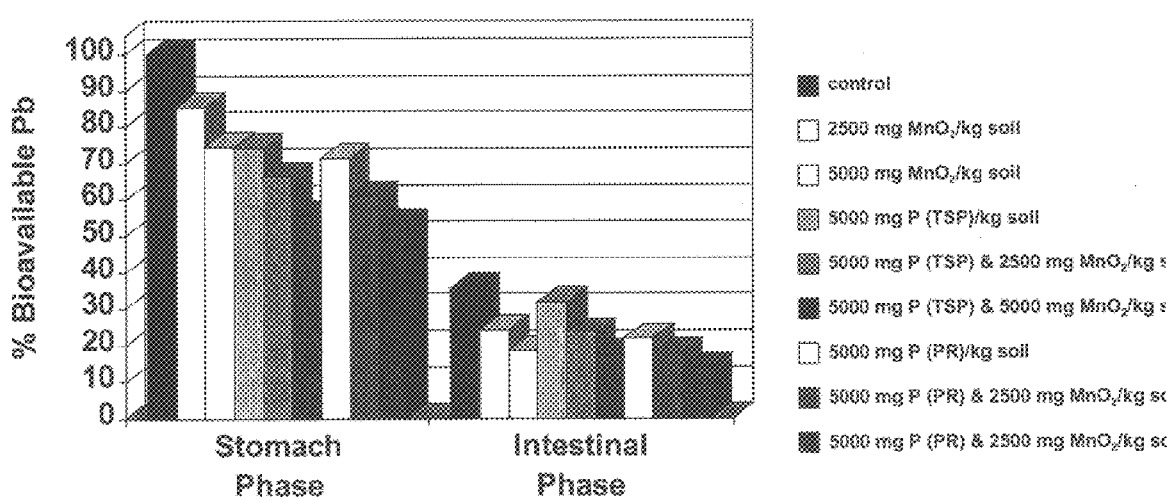
Figure 7 - Bioavailable Pb by PBET: AR
(the averages across the time)

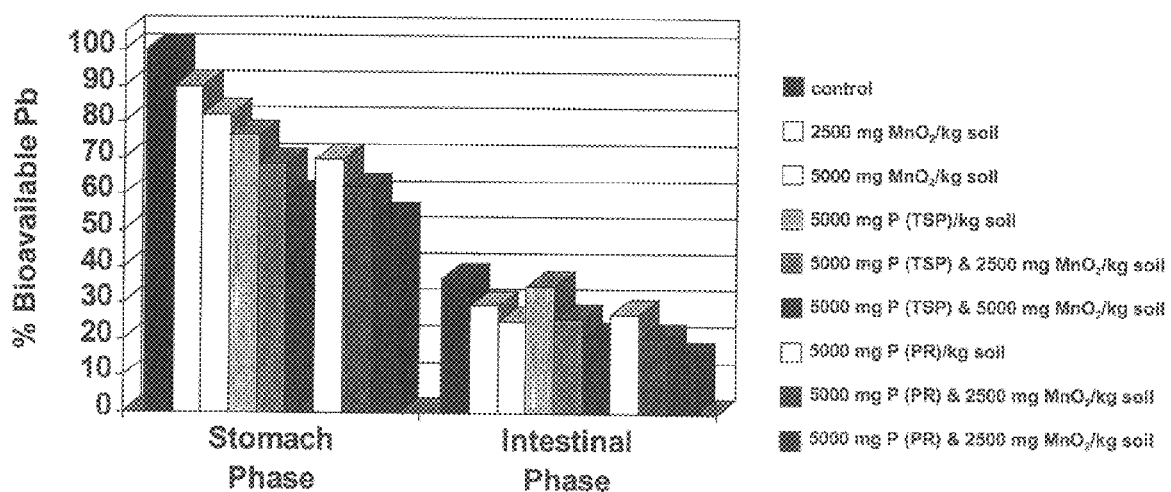

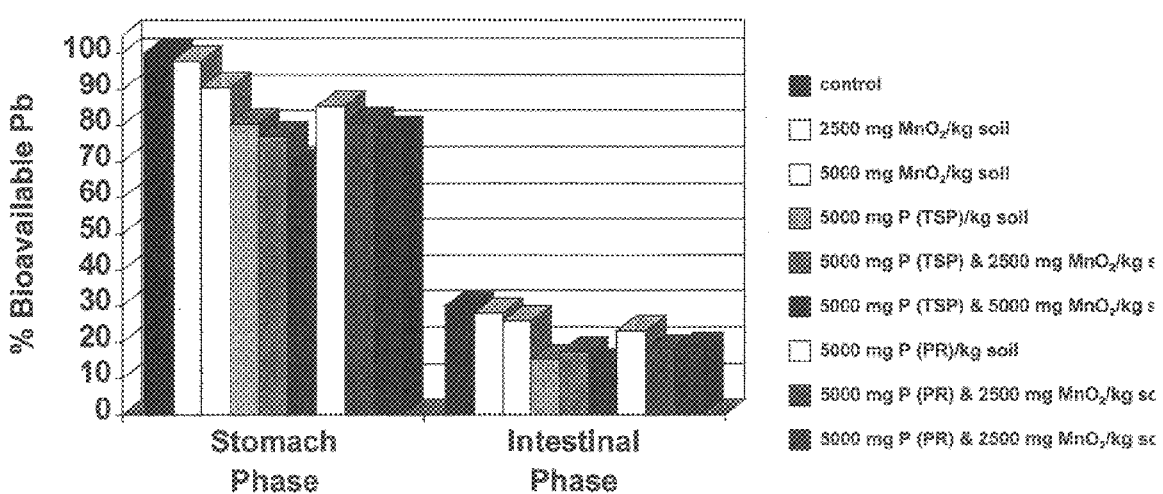

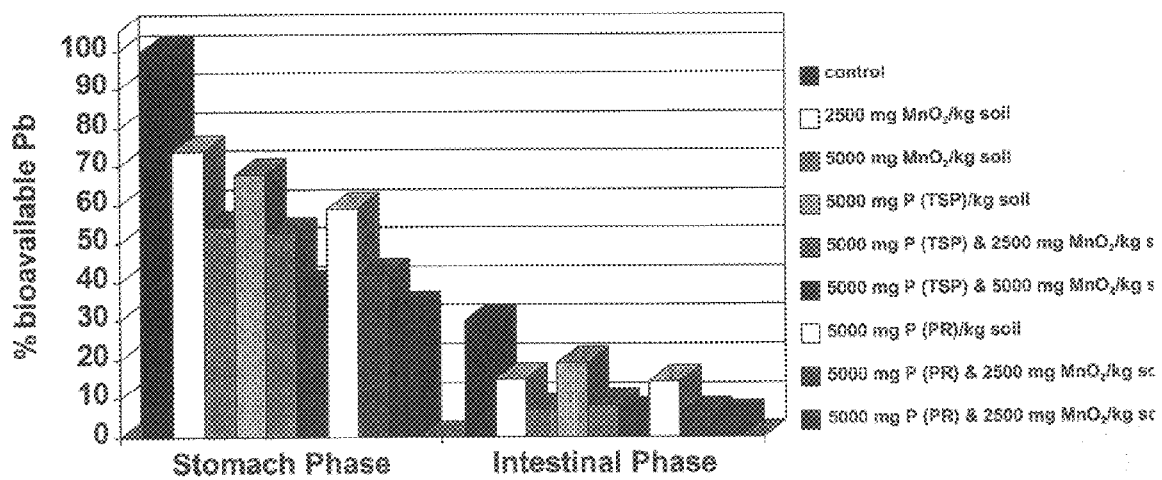
Figure 10 – Bioavailable Pb by PBET: Chat, 4 weeks

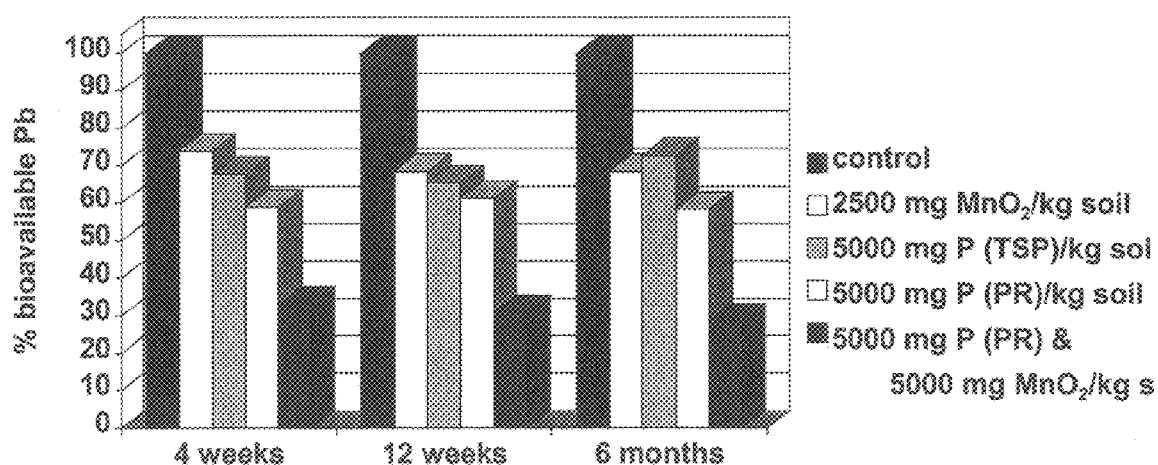
Figure 11 - Bioavailable Pb by PBET: Chat, stomach phase

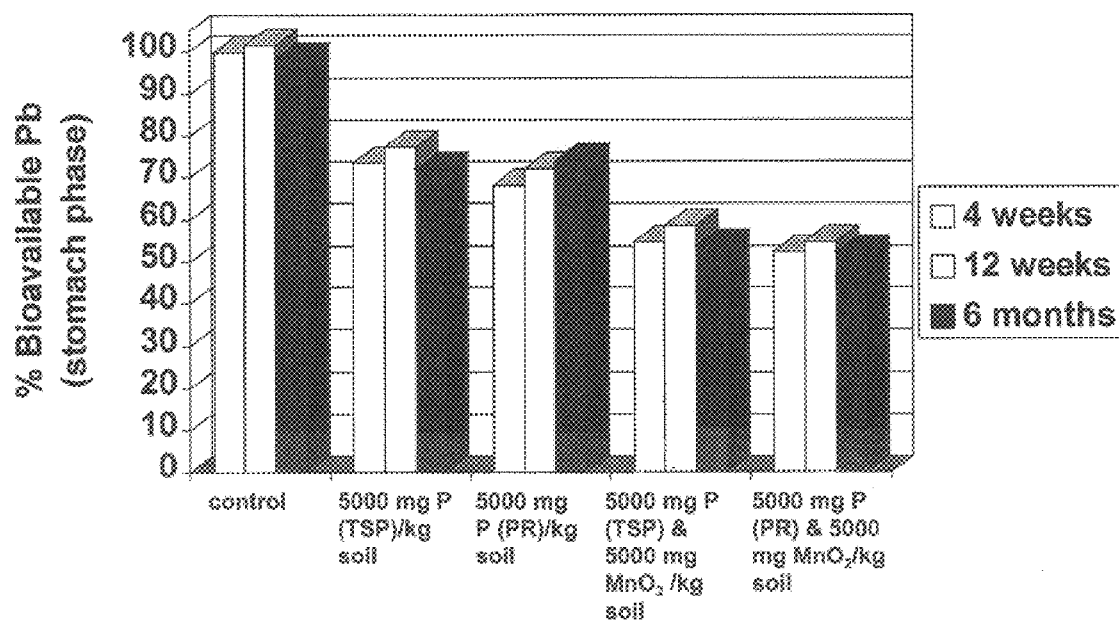
Figure 12 – Effect of time on bioavailable Pb by PBET, AR

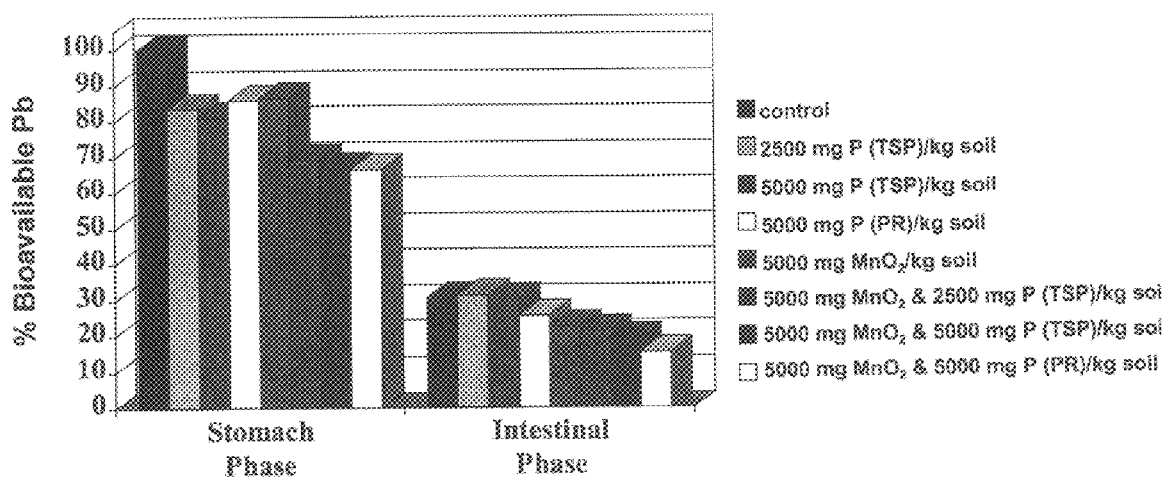
Figure 13 – Bioavailable Pb by PBET: TCR

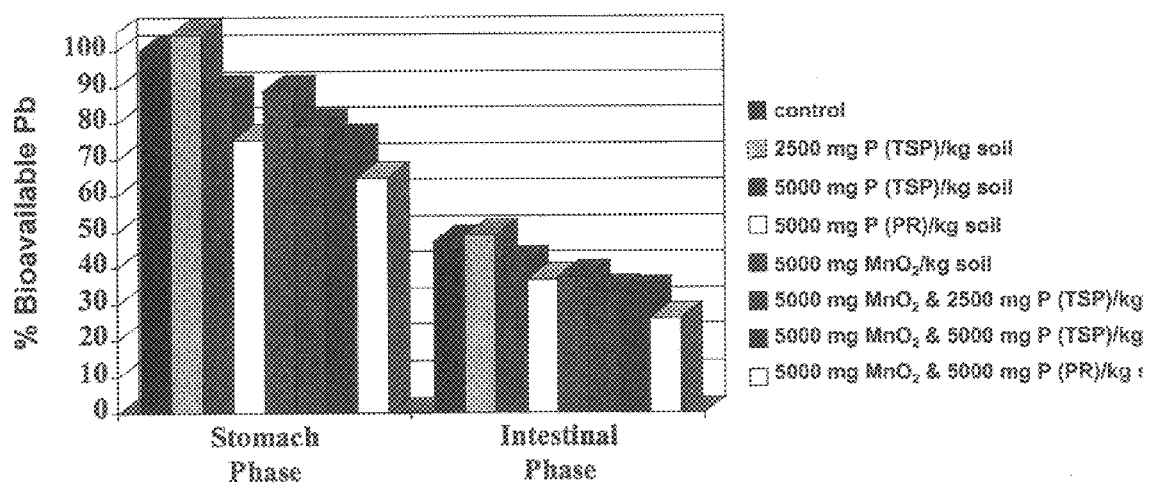
Figure 14 – Bioavailable Pb by PBET: Joplin

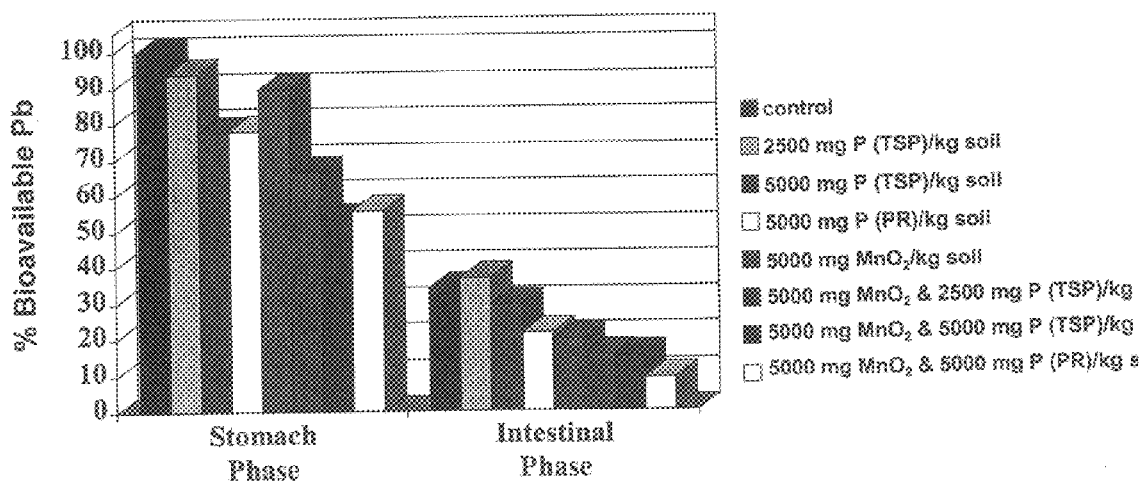
Figure 15 - Bioavailable Pb by PBET: AR

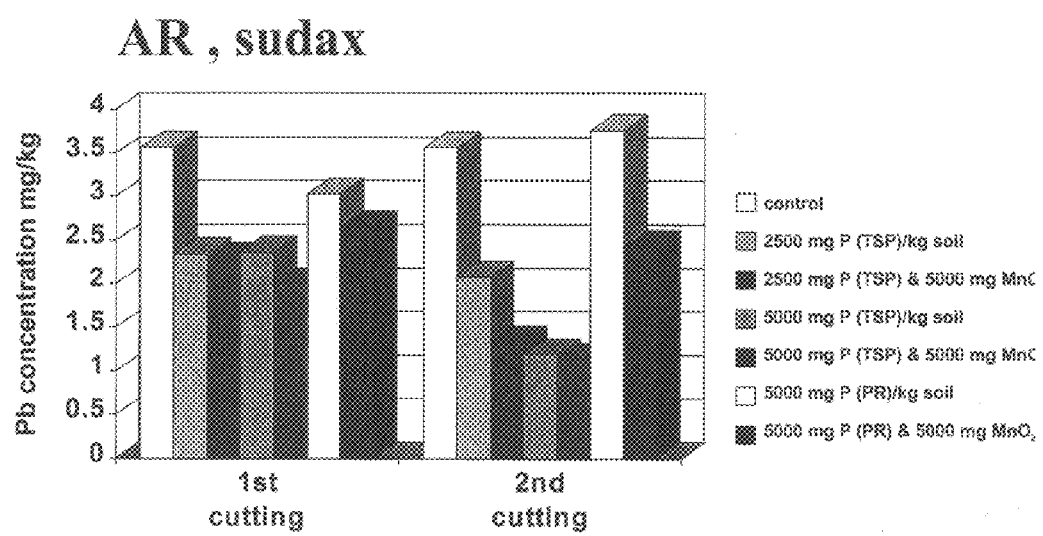
Figure 16 - Shoot tissue concentrations of Pb, AR, sudax

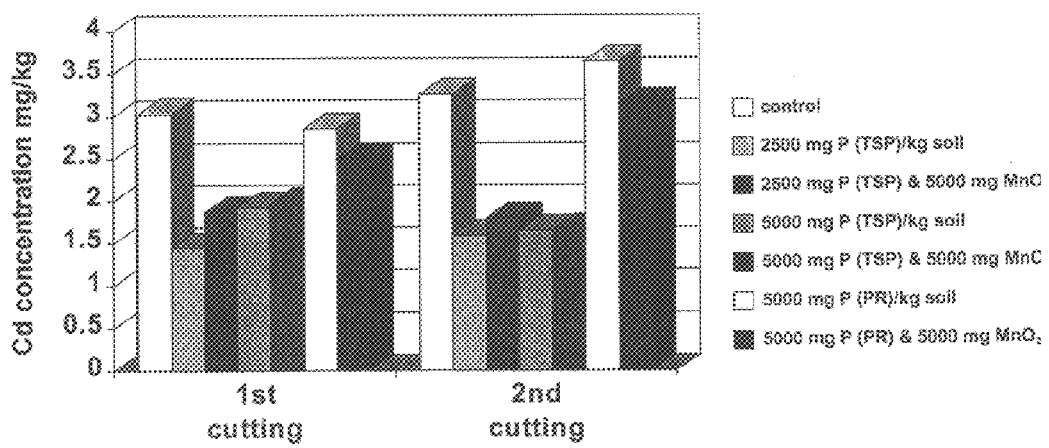
Figure 17 - Shoot tissue concentrations of Cd, AR, Sudax

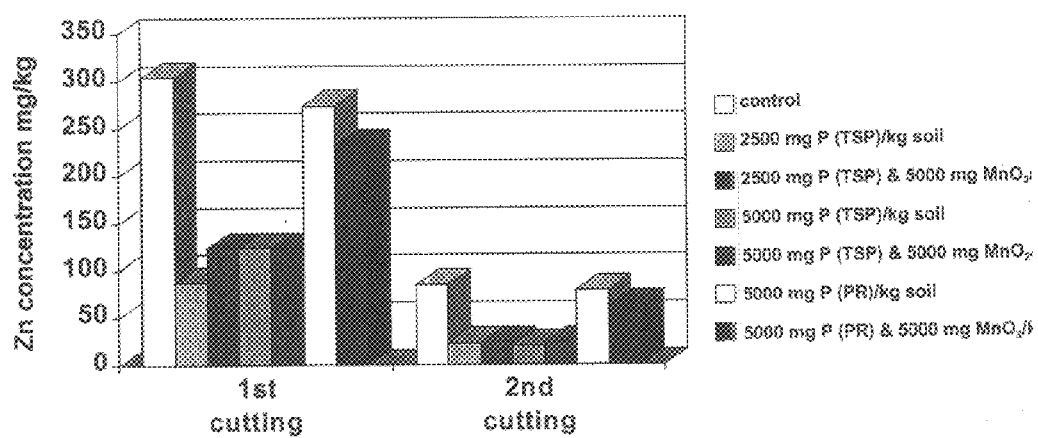
Figure 18 - Shoot tissue concentrations of Zn, AR, Sudax

METHOD OF IN SITU IMMOBILIZATION AND REDUCTION OF METAL BIOAVAILABILITY IN CONTAMINATED SOILS, SEDIMENTS, AND WASTES

FEDERALLY SPONSORED RESEARCH/ DEVELOPMENT PROGRAM

This invention was made with government funding from the U.S. Environmental Protection Agency through EPSCoR grant number R-826401-01-0. The government has certain rights in the invention.

BACKGROUND OF THE INVENTION

1. Field of the Invention

The present invention is broadly concerned with methods and compositions for reducing the bioavailability of metal contaminants in soils. More particularly, the inventive methods comprise mixing a source of phosphorus and an oxide of manganese with the contaminated soil so as to form insoluble metal phosphates. Preferably, the pH of the soil is then adjusted to, and maintained at, specified levels so as to maintain the metals in a non-available form.

2. Description of the Prior Art

Lead (Pb) is toxic to both humans and animals. Lead is particularly toxic to young children. Lead and lead-containing compounds can be found in all parts of the environment, and there is considerable concern regarding lead as a contaminant. For example, lead and lead-containing compounds have been identified as a major hazardous substance at 47% of the 1,219 Superfund sites currently on the Environmental Protection Agency's National Priorities List.

Currently available techniques for cleaning lead-contaminated soil generally comprise capping or excavating the contaminated soil. However, these treatments are often ineffective in fully removing the lead (or other metals for that matter) or in reducing their bioavailability. Furthermore, soil excavation followed by replacement of the excavated soil with clean soil requires a source of clean soil and a repository for the contaminated soil. Thus, these currently available treatment procedures for lead-contaminated soils are costly, disruptive, and not sustainable.

Phosphorus (P) alone has also been used to treat soil contaminated with lead. While these methods have some usefulness, they do not achieve sufficient reduction in the bioavailability of lead. Thus, the health risks associated with contaminated soil are not sufficiently reduced to allow prior art phosphorus treatments to gain acceptance.

There is a need for improved methods for decreasing lead and other metal concentrations in contaminated soils which can be carried out in situ.

SUMMARY OF THE INVENTION

The present invention is broadly concerned with compositions and methods for reducing the bioavailability of metal contaminants in soil. The methods comprise intimately mixing a source of phosphorus and an oxide of manganese with the contaminated soil so as to reduce the metal bioavailability in the soil. Reference is made herein to treatment of contaminated soil, however, this is intended to include other contaminated compositions in addition to or other than soil which contain undesirable levels of metal contaminants (e.g., wastes, sediments, etc.).

In more detail, the phosphorus source should be mixed with the soil at a level of from about 0.1–5% by weight phosphorus, preferably from about 0.1–1.0% by weight phosphorus, and more preferably from about 0.25–0.5% by weight phosphorus, based upon the total weight of the soil taken as 100% by weight. Preferred phosphorus sources include those selected from the group consisting of phosphate rock, orthophosphoric acid, metal phosphates (e.g., alkali and alkaline earth metal phosphates such as calcium orthophosphates and potassium orthophosphates), ammonium phosphates, ammonium orthophosphates (e.g., monoammonium orthophosphates, diammonium orthophosphates, and ammonium polyphosphate liquids which typically include orthophosphates and condensed phosphates), and various P-containing fertilizing materials such as superphosphates and triple superphosphates.

The oxide of manganese should be mixed with the soil at a level of from about 0.1–5% by weight oxide of manganese, preferably from about 0.1–1.0% by weight oxide of manganese, and more preferably from about 0.25–0.5% by weight oxide of manganese, based upon the total weight of the soil taken as 100% by weight. Preferred oxides of manganese include $Mn_2O$ and $Mn_3O_4$, as well as those derived from minerals such as birnessite, cryptomelane, psilomelanes, pyrolusite, nsutite, hollandite, coronadite, romanechite, vernadite, lithiophorite, manganite, and hausmannite in general.

In another aspect, a mixture of discrete granules of the phosphorus source and discrete granules of the oxide of manganese are present in a premix which can be mixed with the soil to achieve the above-described levels of phosphorus and manganese oxide.

As used herein, "discrete" and "physically separate from one another" is intended to mean that the granules do not include both the phosphorus source and the oxide of manganese in the same granule.

Alternately, the components can be mixed with the soil individually in the concentrations described previously, preferably with the phosphorus source being mixed with the soil first followed by mixing of the manganese oxide with the resulting phosphorus/soil mixture.

In yet another embodiment, the phosphorus source and oxide of manganese can be mixed so as to form a substantially homogeneous mixture. The resulting mixture can then be granulated by using known granulation processes, and the granulated product can be used according to the inventive methods.

Regardless of the embodiment, after mixing with source of phosphorus and oxide of manganese with the soil, the pH of the soil is preferably adjusted (if necessary) to a level of at least about 7.0, and preferably to a level of from about 7.0–8.0. Prior to pH adjustment, the soil will generally be acidic, thus requiring the use of an alkaline material such as CaO, $CaCO_3$, $MgCO_3$, quick lime, limestone, and Ag-lime. The pH adjustment should be carried out from about 20–28 hours, and preferably about 24 hours, after the phosphorus source and oxide of manganese are mixed with the soil. It is preferred that the pH of the soil be monitored at regular intervals (e.g., every year) after treatment so that the pH can be maintained in the desired range. Finally, those skilled in the art will appreciate that soil treatment according to the invention can be carried out in situ, or the soil can be excavated and moved to another location for treatment and then returned to its original location.

It is believed that the inventive methods and compositions decrease the bioavailability of the metal contaminant by forming essentially irreversibly adsorbed metals and by causing the metal to react with the phosphorus source to form insoluble metal phosphates (e.g., lead phosphate minerals or pyromorphites), thus rendering the metal contaminant non-bioavailable. Thus, the decontaminated soil will include a total non-naturally occurring phosphate content (as used in this context, the phosphate fraction of the resulting metal phosphates and the phosphate fraction with metals adsorbed thereon) of at least about 0.1% by weight phosphate, preferably at least about 0.5% by weight phosphate, and more preferably from about 1–5% by weight phosphate, based upon the total weight of the soil taken as 100% by weight.

The inventive methods and compositions are particularly useful for reducing the bioavailability of Group IIB metals (e.g., lead, zinc, cadmium) and Group VIII metals (e.g., iron, nickel). Thus, about 24 hours after the phosphorus source and oxide of manganese are mixed with the contaminated soil, the metal bioavailability in the soil is reduced by at least about 20%, and preferably at least about 40%, with the metal bioavailability being determined by the stomach phase of the Physiologically Based Extractions Test (PBET) as herein defined. Or, as determined by the Toxicity Characteristic Leaching Procedure (TCLP) as herein defined, the leachability of lead is less than about 5 mg/L, and preferably less than about 2 mg/L, about 24 hours after treatment.

Furthermore, 90 days after treatment, the bioavailability of the metal will increase by less than about 10%, and preferably less than about 5%, above the bioavailability about 24 hours after mixing. Finally, even after the growing of plants in the treated soil, the bioavailability of the contaminant metals will remain substantially unchanged. That is, if a plant is allowed to grow for about 8 weeks in the treated soil, the bioavailability of metal in the soil will increase by less than about 10%, and preferably less than about 5%, during the plant growth.

BRIEF DESCRIPTION OF THE DRAWINGS

FIG. 1 is a graph depicting and comparing the bioavailability of lead in Dearing soil after various prior art treatments;

FIG. 2 is a graph depicting and comparing the bioavailability of lead in TCR soil after various prior art treatments;

FIG. 3 is a graph depicting and comparing the bioavailability of lead in Joplin soil after various prior art treatments;

FIG. 4 is a graph depicting and comparing the bioavailability of lead in AR soil after various prior art treatments;

FIG. 5 is a graph depicting and comparing the bioavailability of lead in Chat soil after various prior art treatments;

FIG. 6 is a graph depicting and comparing the bioavailability of lead in Joplin soil after various treatments, including treatments according to the invention;

FIG. 7 is a graph depicting and comparing the bioavailability of lead in AR soil after various treatments, including treatments according to the invention;

FIG. 8 is a graph depicting and comparing the bioavailability of lead in TCR soil after various treatments, including treatments according to the invention;

FIG. 9 is a graph depicting and comparing the bioavailability of lead in Dearing soil after various treatments, including treatments according to the invention;

FIG. 10 is a graph depicting and comparing the bioavailability of lead in Chat soil after various treatments, including treatments according to the invention;

FIG. 11 is a graph depicting and comparing the bioavailability of lead over time in Chat soil after various prior art treatments and treatments according to the invention;

FIG. 12 is a graph depicting and comparing the bioavailability of lead over time in AR soil after various prior art treatments and treatments according to the invention;

FIG. 13 is a graph depicting and comparing the bioavailability of lead in TCR soil after various treatments, including treatments according to the invention;

FIG. 14 is a graph depicting and comparing the bioavailability of lead in Joplin soil after various treatments, including treatments according to the invention;

FIG. 15 is a graph depicting and comparing the bioavailability of lead in AR soil after various treatments, including treatments according to the invention;

FIG. 16 is a graph depicting and comparing lead concentrations in shoot tissue from Sudax grass grown in AR soil after various treatments, including treatments according to the invention;

FIG. 17 is a graph depicting and comparing cadmium concentrations in shoot tissue from Sudax grass grown in AR soil after various treatments, including treatments according to the invention; and FIG. 18 is a graph depicting and comparing zinc concentrations in shoot tissue from Sudax grass grown in AR soil after various treatments, including treatments according to the invention.

DETAILED DESCRIPTION OF THE PREFERRED EMBODIMENTS

Examples

The following examples set forth preferred methods in accordance with the invention. It is to be understood, however, that these examples are provided by way of illustration and nothing therein should be taken as a limitation upon the overall scope of the invention.

Materials and Methods
Soil Samples
The soil samples utilized in these examples were as follows:

(1) Time Critical Repository (TCR)—soil with high lead concentrations obtained from mining area near Joplin, Mo.;

(2) Active Repository (AR)—dumping soil;

(3) Joplin—soil obtained from a vacant lot in Joplin, Mo.;

(4) Chat—mine waste soil obtained from Galena, Kan.; and (5) Dearing—soil with high lead and zinc concentrations obtained from a smelter in Dearing, Kan.

Physiologically Based Extractions Test

In each of the following examples, the in vitro bioaccessibility test (hereinafter referred to PBET) performed was a modified version of that described by Ruby et al. in Estimation of Bioavailability Using a Physiologically Based Extraction Test, *Environ. Sci. Technol.*, 30:422–430(1996). Specifically, a gastric solution was prepared by adding the following compounds to four liters of deionized water: 5 g of Pepsin A (from porcine stomach mucosa obtained from Sigma, with an activity of 800–2500 units/mg-P 7000); 2 g of citric anhydrous (USP $C_6H_8O_7$ from Sigma); 2 g of DL-malic acid (DL-hydroxybutanedioic acid $C_4H_6O_5$ from Sigma); 1.68 ml of DL-lactic acid ($C_3H_6O_3$ synthetic: 85% (w/w) syrup approximately 98%, from Sigma); and 2 ml acetic acid, glacial ($CH_3COOH$, from Fisher Scientific). Hydrochloric acid (concentrated) was added to the solution as necessary to maintain the pH of the mixture of soil and gastric solution at 2.0. Thus, the amount of HCl needed depends upon the particular soil sample. In the below-described tests, the amount of HCl was as follows:

(1) TCR, AR, and Joplin soils—1.17 ml of HCl per 1000 ml of gastric solution;

(2) Chat soil—1.37 ml of HCl per 1000 ml of gastric solution; and (3) Dearing soil—1.57 ml of HCl per 1000 ml of gastric solution.

1. Gastric or Stomach Phase Procedure

One gram of soil and 100 ml of the prepared gastric solution was added to a 125 ml, wide-mouth HDPE bottle in an incubator maintained at 37° C. The bottle head space was replaced with argon gas and was shaken continuously for 1 hour using an orbital shaker (180 rpm) which was placed in the incubator, with the solution pH being maintained at 2.0 throughout this period. Next, a 10 ml aliquot of the solution was removed (using a cellulose acetate membrane filter attached to a 10 cc disposable syringe) for analysis (reported as stomach phase data). Finally, 10 ml of the gastric solution was added to the bottle to replace the 10 ml that was removed.

2. Intestinal Phase Procedure

The pH of the gastric solution from Part 1 above was increased to 7.0 by adding cellulose ester membrane tubing (MWCO 100,000) containing 2.5 g of $NaHCO_3$. This step was carried out in an incubator (37° C.) while the bottles were uncapped and shaken at a lower speed (110 rpm). After the pH of the solution was 7.0±0.2 (about 28–30 minutes), 0.175 g of bile extract (porcine, from Sigma) and 0.05 g of pancreatin (porcine pancreas, from Sigma) were added to the solution after which the bottle was recapped. The bottle head space was replaced with argon gas, and the sample was shaken (180 rpm) for 1 hour at 37° C. A 10 ml aliquot was removed from the sample at the end of the 1 hour shaking. A drop of concentrated $HNO_3$ was added to each aliquot, and the sample was analyzed.

In both the gastric phase and intestinal phase procedures described above, if samples were not analyzed immediately, they were stored at 4° C. until analysis. All data were obtained using Inductively Coupled Plasma-Atomic Emission Spectroscopy (ICP-AES).

Toxicity Characteristic Leaching Procedure (TCLP)

For the TCLP procedure, an extracting solution was prepared comprising 5.7 mL of glacial acetic acid diluted with deionized water to 1 liter. The pH of the extracting solution was 2.88±0.01 as is required for this test. Twenty milliliters of the extracting solution was added to a glass bottle containing 1 g of the particular soil sample. The bottle was sealed with a screw cap lid and placed on a end-to-end shaker at 180 excursions/min. for 18 hours at 23° C. Filtered samples were then analyzed for lead using ICP-AES.

Example 1

P Treatments Without Manganese Oxides

For comparison purposes, five contaminated soils/mine waste materials (TCR, AR, Joplin, Dearing, and Chat) were collected from the tri-state (Missouri, Kansas, Oklahoma) mining area. The total metal concentrations in the samples ranged from 1200 to 9100 mg Pb/kg of soil, 30 to 190 mg Cd/kg of soil, and 4500 to 42,600 mg Zn/kg of soil, and are shown in Table 1.

TABLE 1

Selected Chemical Properties of Soil Materials

| Soil Material | mg $Pb_T$/kg of soil | mg $Cd_T$/kg of soil | mg $Zn_T$/kg of soil | Initial pH |
|---|---|---|---|---|
| TCR | 3291 | 48 | 8650 | 7.0 |
| AR | 1374 | 31 | 6338 | 7.0 |
| Joplin | 2832 | 26 | 4463 | 6.7 |
| Chat | 1180 | 100 | 28,616 | 7.3 |
| Dearing | 9111 | 190 | 42,592 | 6.0 |

Seven treatments were used on the various soil materials. They were as follows:

(1) 0 P (control);

(2) 2500 mg P/kg of soil, with the P being obtained from triple super phosphate (TSP);

(3) 2500 mg P/kg of soil, with the P being obtained from phosphate rock (PR);

(4) acetic acid followed by 2500 mg P/kg of soil, with the P being obtained from TSP;

(5) 2500 mg P/kg of soil, with the P being obtained from phosphoric acid;

(6) 5000 mg P/kg of soil, with the P being obtained from TSP; and (7) 5000 mg P/kg of soil, with the P being obtained from PR.

Twenty-four hours after treatment, predetermined amounts of CaO were added to samples as necessary to adjust the soil pH to 7.0 or higher. The CaO was utilized to increase the soil pH. The effects of CaO addition on the AR soil samples treated with CaO are demonstrated in Table 2.

TABLE 2

AR Soil pH

| Treatment | CaO Addition | |
| | Before | After |
|---|---|---|
| Control[a] | 7.0 | 7.1 |
| TSP5000 | 5.2 | 6.8 |
| Acetic | 5.4 | 7.3 |
| PR5000[a] | 7.1 | 7.1 |
| Phosphoric Acid | 4.9 | 6.8 |

[a]No CaO was added during this treatment.

Triplicate samples were incubated at 7 different sampling times (at 3 days and at 1, 4, 12, 24, 36, and 48 weeks) at 20% gravimetric moisture content and 25° C. The air-dried samples were analyzed for soil pH and bioavailable Pb by the PBET described previously. Dissolved concentrations of Pb, Cd, and Zn in the extractions were analyzed using ICP-AES, and x-ray diffraction data was collected for the less than 10 $\mu$m size fraction separated by an ATM sonic sifter.

The results from these tests are shown in FIGS. 1–5. The acetic acid, phosphoric acid, and TSP5000 treatments (numbers (4)–(6) above) reduced the soil pH to approximately 5.0 while the PR treatment (number (7) above) had no effect on the soil pH even at high concentrations.

There were no changes in bioavailability when comparing results from various sampling times. Therefore, results from all samples were averaged over time. The maximum reduction in Pb bioavailability, as indicated by the stomach phase of the PBET, was approximately 35% compared to the control using either the TSP5000 or PR5000. Using 5000 mg P/kg of soil rather than 2500 mg P/kg of soil resulted in a greater reduction in Pb bioavailability. Generally, the addition of P alone produced less than 20% reduction in bioavailability as compared to the control.

Example 2

P and Manganese Oxides Treatments

In this series of tests, nine treatments were used on the various soil materials (Joplin, AR, TCR, Chat, and Dearing). They were as follows:

(1) 0 P (control);
(2) 5000 mg of P/kg of soil, with the P being obtained from TSP;
(3) 5000 mg of P/kg of soil, with the P being obtained from PR;
(4) 2500 mg of $MnO_2$/kg of soil;
(5) 5000 mg of $MnO_2$/kg of soil;
(6) 2500 mg of $MnO_2$ and 5000 mg of P/kg of soil, with the P being obtained from TSP;
(7) 2500 mg of $MnO_2$ and 5000 mg of P/kg of soil, with the P being obtained from PR;
(8) 5000 mg of $MnO_2$ and 5000 mg of P/kg of soil, with the P being obtained from TSP; and
(9) 5000 mg of MnO2 and 5000 mg of P/kg of soil, with the P being obtained from PR.

After the soil was treated, CaO was added in treatments (2)–(9) above (i.e., all samples except the control sample) to raise the pH to about 7.0. The samples were then tested with the PBET test previously described. FIGS. 7–10 (for the Joplin, AR, TCR, and Dearing samples) show the results of these treatments as averages of measurements taken from 3 days to 6 months after treatment. FIG. 11 (for the Chat sample) shows measurements which were taken at 4 weeks. FIG. 12 shows the bioavailability of lead (stomach phase) of the Chat sample at 4 weeks, 12 weeks, and 6 months. FIG. 13 depicts the bioavailability of lead in the AR sample at 4 weeks, 12 weeks, and 6 months. These results show that the combination of P and $MnO_2$ together is more effective than when either of P or $MnO_2$ is used alone. Furthermore, the data of FIGS. 12 and 13 indicate that the lead bioavailability remains essentially unchanged over time.

The Dearing and TCR samples were also tested with the TCLP test previously described. These results are shown in Table 3. Without treatment, both the Dearing and TCR samples exceeded the 5 mg Pb/L benchmark and would be characterized as hazardous waste by the TCLP procedure. The addition of PR and $MnO_2$ alone or in combination provided some reduction in extractable Pb, but with the Dearing sample this reduction did not bring extractable Pb below the 5 mg/L threshold. The greatest reductions in extractable Pb were realized with the TSP and $MnO_2$ combinations. For both samples, these treatments lowered extractable Pb to values much less than 5 mg/L.

TABLE 3

Modified TCLP test results for Pb from samples incubated for 4 weeks.

| Treatment No.[1] | Dearing mg/L | TCR mg/L |
|---|---|---|
| (1) | 7.3a[2] | 5.9a |
| (2) | 2.1f | 0.8e |
| (3) | 6.8b | 4.7b |
| (4) | 6.9b | 4.6b |
| (5) | 6.3c | 3.6c |
| (6) | 1.9fg | 0.5e |
| (7) | 5.7d | 3.7c |
| (8) | 1.6g | 0.4e |
| (9) | 5.2e | 2.5d |

[1]Corresponds to treatment numbers set forth at the beginning of this example.
[2]Means within a column having the same letter are not significantly different at P = 0.05.

Example 3

Lead Levels in Treated Soils After Plant Growth

This set of tests was carried out to determine the effects of continuous P removal through plant growth on lead bioavailability after soil treatment. Eight treatments were utilized as follows:

(1) 0 P (control);
(2) 2500 mg of P/kg of soil, with the P being obtained from TSP;
(3) 5000 mg of P/kg of soil, with the P being obtained from TSP;
(4) 5000 mg of P/kg of soil, with the P being obtained PR;
(5) 5000 mg of $MnO_2$/kg of soil;
(6) 5000 mg of $MnO_2$ and 2500 mg of P/kg of soil, with the P being obtained from TSP;
(7) 5000 mg of $MnO_2$ and 5000 mg of P/kg of soil, with the P being obtained from TSP; and
(8) 5000 mg of $MnO_2$ and 5000 mg of P/kg of soil, with the P being obtained from PR.

The soil samples (TCR, Joplin, AR) were subjected to the above treatments after which CaO was added in treatments (2)–(8) above (i.e., all samples except the control sample) to raise the pH to about 7.0. Sudax grass (a hybrid of sorghum and Sudan grass) was then planted and allowed to grow for four consecutive growing periods (with each growing period being 8 weeks). The grass was cut between each growing period. After the completion of the four growing periods, the soils were tested following the PBET test procedure discussed previously. This data is set forth in FIGS. 14–16. These results indicate that the lead bioavailability remained essentially unchanged after the growth periods for those samples treated according to the invention. Furthermore, the soil samples treated with a combination of P and $MnO_2$ had consistently lower lead bioavailability compared to all other soil samples.

Example 4

Metal Levels in Plants Growing in Treated Soils

This set of tests was carried out to determine the metal levels in plants growing in soil treated according to the invention. Seven treatments were utilized as follows:

(1) 0 P (control);
(2) 2500 mg of P/kg of soil, with the P being obtained from TSP;
(3) 5000 mg of P/kg of soil, with the P being obtained from TSP;

(4) 5000 mg of P/kg of soil, with the P being obtained PR;

(5) 5000 mg of $MnO_2$/kg of soil;

(6) 5000 mg of $MnO_2$ and 2500 mg of P/kg of soil, with the P being obtained from TSP;

(7) 5000 mg of $MnO_2$ and 5000 mg of P/kg of soil, with the P being obtained from TSP; and (8) 5000 mg of $MnO_2$ and 5000 mg of P/kg of soil, with the P being obtained from PR.

The soil samples (AR) were subjected to the above treatments after which CaO was added in treatments (2)–(7) above (i.e., all samples except the control sample) to raise the pH to about 7.0. Sudax grass was then planted and allowed to grow for 8 weeks. The grass was cut, and shoot samples were oven dried (for about 5–6 days) at 55–60° C. A 0.5 g portion of each dried sample was digested with 10 ml of concentrated $HNO_3$ and analyzed. Lead concentrations were determined by Graphite Tube Atomizer connected to Atomic Absorption Spectrometry, while zinc and cadmium concentrations were analyzed by ICP-AES. This data is set forth in FIGS. 17–18. These results indicate that the concentrations of lead, cadmium and zinc in the Sudax were reduced after TSP addition compared to the control for all three soil samples. However, the concentrations of lead, cadmium and zinc did not change with PR addition. In general, however, treatments which included both P and $MnO_2$ significantly reduced metal uptake compared to the control.

We claim:

1. A method of reducing the bioavailability of a metal in soil comprising the step of mixing a source of phosphorus and from about 0.1–5% by weight of a source consisting essentially of an oxide of manganese with the soil so as to reduce the metal bioavailability, said source of phosphorus being mixed with the soil at sufficient levels to provide from about 0.1–5% by weight phosphorus, said percentages by weight being based upon the total weight of the soil taken as 100% by weight.

2. The method of claim 1, wherein said mixing step comprises, in order:
   mixing the source of phosphorus with the soil to yield a phosphorus and soil mixture; and
   mixing the oxide of manganese with said phosphorus and soil mixture.

3. The method of claim 2, further including the step of adjusting the pH of the reduced, metal bioavailable soil to a level of at least about 7.0.

4. The method of claim 3, wherein said pH adjusting step is carried out from about 20–28 hours after said mixing step.

5. The method of claim 4, further including the steps of monitoring the pH of said reduced, metal bioavailable soil and adjusting the pH as necessary to maintain said pH level.

6. The method of claim 1, wherein said mixing step comprises mixing a premix including the source of phosphorus and the oxide of manganese with said soil.

7. The method of claim 6, further including the step of adjusting the pH of the reduced, metal bioavailable soil to a level of at least about 7.0.

8. The method of claim 7, wherein said pH adjusting step is carried out from about 20–28 hours after said mixing step.

9. The method of claim 8, further including the steps of monitoring the pH of said reduced, metal bioavailable soil and adjusting the pH as necessary to maintain said pH level.

10. The method of claim 1, wherein said mixing step comprises mixing granules with said soil, said granules comprising a substantially homogeneous mixture of the source of phosphorus and the oxide of manganese.

11. The method of claim 10, further including the step of adjusting the pH of the reduced, metal bioavailable soil to a level of at least about 7.0.

12. The method of claim 11, wherein said pH adjusting step is carried out from about 20–28 hours after said mixing step.

13. The method of claim 12, further including the steps of monitoring the pH of said reduced, metal bioavailable soil and adjusting the pH as necessary to maintain said pH level.

14. The method of claim 1, wherein said mixing step results in reduced bioavailability of a metal selected from the group consisting of lead, zinc, and cadmium.

15. The method of claim 1, wherein said source of phosphorus is selected from the group consisting of phosphate rock, alkali and alkaline earth metal phosphates, ammonium phosphates, ammonium orthophosphates, orthophosphoric acid, and superphosphates.

16. The method of claim 1, wherein said oxide of manganese is selected from the group consisting of $MnO_2$, $Mn_3O_4$, birnessite, cryptomelane, and psilomelanes.

17. The method of claim 1, wherein said mixing step results in the formation of a metal phosphate.

18. The method of claim 1, wherein said mixing step results in the formation of phosphates having said metal adsorbed thereon.

19. The method of claim 1, wherein said mixing step is carried out in situ.

20. The method of claim 1, further including the steps of excavating said soil from a target location prior to said mixing step and returning said reduced, metal bioavailable soil to said location after said mixing step.

21. The method of claim 1, wherein the bioavailability of said metal as determined by the stomach phase of the PBET is reduced by at least about 20% about 24 hours after said mixing step.

22. The method of claim 1, wherein the leachability of lead as determined by the TCLP test is less than about 5 mg/L about 24 hours after said mixing step.

23. The method of claim 21, wherein the bioavailability of said metal increases by less than about 10% about 90 days after said mixing step as compared to the metal bioavailability about 24 hours after said mixing step.

24. The method of claim 21, further including the step of growing a plant in said soil after said mixing step for about 8 weeks, wherein the bioavailability of said metal in the soil increases by less than about 10% during said 8-week plant growth.

25. A method for reducing the bioavailability of a metal in soil comprising the steps of:
   mixing a source of phosphorus and an oxide of manganese with the soil so as to reduce the metal bioavailability; and
   adjusting the pH of the reduced, metal bioavailable soil to a level of at least about 7.0.

26. The method of claim 25, wherein said source of phosphorus is mixed in sufficient levels to provide from about 0.1–5% by weight phosphorus, based upon the total weight of the soil taken as 100% by weight.

27. The method of claim 25, wherein said oxide of manganese is mixed with said soil at a level of from about 0.1–5% by weight oxide of manganese, based upon the total weight of the soil taken as 100% by weight.

28. The method of claim 25, wherein said mixing step comprises, in order:
   mixing the source of phosphorus with the soil to yield a phosphorus and soil mixture; and
   mixing the oxide of manganese with said phosphorus and soil mixture.

29. The method of claim 25, wherein said mixing step comprises mixing a premix including the source of phosphorus and the oxide of manganese with said soil.

30. The method of claim 25, wherein said pH adjusting step is carried out from about 20–28 hours after said mixing step.

31. The method of claim 25, further including the steps of monitoring the pH of said reduced, metal bioavailable soil and adjusting the pH as necessary to maintain said pH level.

32. The method of claim 25, wherein said mixing step results in reduced bioavailability of a metal selected from the group consisting of lead, zinc, and cadmium.

33. The method of claim 25, wherein said source of phosphorus is selected from the group consisting of phosphate rock, alkali and alkaline earth metal phosphates, ammonium phosphates, ammonium orthophosphates, orthophosphoric acid, and superphosphates.

34. The method of claim 25, wherein said oxide of manganese is selected from the group consisting of $MnO_2$, $Mn_3O_4$, birnessite, cryptomelane, and psilomelanes.

35. The method of claim 25, wherein said mixing step results in the formation of a metal phosphate.

36. The method of claim 25, wherein said mixing step results in the formation of phosphates having said metal adsorbed thereon.

37. The method of claim 25, wherein the mixing step is carried out in situ.

38. The method of claim 25, further including the steps of excavating said soil from a target location prior to said mixing step and returning said reduced, metal bioavailable soil to said location after said mixing step.

39. The method of claim 25, wherein the bioavailability of said metal as determined by the stomach phase of the PBET is reduced by at least about 20% about 24 hours after said pH adjusting step.

40. The method of claim 25, wherein the leachability of lead as determined by the TCLP test is less than about 5 mg/L about 24 hours after said mixing step.

41. The method of claim 39, wherein the bioavailability of said metal increases by less than about 10% about 90 days after said mixing step as compared to the metal bioavailability about 24 hours after said mixing step.

42. The method of claim 39, further including the step of growing a plant in said soil after said mixing step for about 8 weeks, wherein the bioavailability of said metal in the soil increases by less than about 10% during said 8-week plant growth.

43. A quantity of decontaminated soil which had metal contaminants therein prior to decontamination thereof, said decontaminated soil consisting essentially of, in combination with the soil, quantities of a non-naturally occurring phosphate chemically bound with said metal contaminants forming metal phosphates which reduce the bioavailability of the metal contaminants, and an oxide of manganese, the total content of phosphate in the decontaminated soil being at least about 0.1% by weight phosphate, based upon the weight of the soil taken as 100% by weight, said metal phosphates and said oxide of manganese being physically separate from one another and intimately admixed with said soil.

44. The decontaminated soil of claim 43, said decontaminated soil further comprising quantities of a non-naturally occurring phosphate having said metal contaminants adsorbed thereon.

45. A method of reducing the bioavailability of a metal in soil comprising, in order, the steps of:
mixing a source of phosphorus with the soil to yield a phosphorus and soil mixture, said source of phosphorus being mixed with the soil at sufficient levels to provide from about 0.1–5% by weight phosphorus;
mixing an oxide of manganese with said phosphorus and soil mixture so as to reduce the metal bioavailability, said oxide of manganese being mixed with said phosphorus and soil mixture at sufficient levels to provide from about 0.1–5% by weight oxide of manganese, said percentages by weight being based upon the total weight of the soil taken as 100% by weight; and
adjusting the pH of the reduced, metal bioavailable soil to a level of at least about 7.0.

46. The method of claim 45, wherein said pH adjusting step is carried out from about 20–28 hours after said mixing step.

47. The method of claim 46, further including the steps of monitoring the pH of said reduced, metal bioavailable soil and adjusting the pH as necessary to maintain said pH level.

48. A method of reducing the bioavailability of a metal in soil comprising the steps of:
mixing a premix with the soil so as to reduce the metal bioavailability, said premix including a source of phosporous and from about 0.1–5% by weight of an oxide of manganese, said premix being mixed with the soil at sufficient levels to provide from about 0.1–5% by weight phosphorous, said percentages by weight being based upon the total weight of the soil taken as 100% by weight; and
adjusting the pH of the reduced, metal bioavailabile soil to a level of at least about 7.0.

49. The method of claim 48, wherein said pH adjusting step is carried out from about 20–28 hours after said mixing step.

50. The method of claim 49, further including the steps of monitoring the pH of said reduced, metal bioavailable soil and adjusting the pH as necessary to maintain said pH level.

51. A method of reducing the bioavailability of a metal in soil comprising the steps of:
mixing granules with the soil so as to reduce the metal bioavailability, said granules comprising a substantially homogeneous mixture of a source of phosphorous and from about 0.1–5% by weight of an oxide of manganese, said granules being mixed with the soil at sufficient levels to provide from about 0.1–5% by weight phosphorous, said percentages by weight being based upon the total weight of the soil taken as 100% by weight; and
adjusting the pH of the reduced, metal bioavailabile soil to a level of at least about 7.0.

52. The method of claim 51, wherein said pH adjusting step is carried out from about 20–28 hours after said mixing step.

53. The method of claim 52, further including the steps of monitoring the pH of said reduced, metal bioavailable soil and adjusting the pH as necessary to maintain said pH level.

* * * * *